US010782442B2

(12) United States Patent
Contreras

(10) Patent No.: US 10,782,442 B2
(45) Date of Patent: Sep. 22, 2020

(54) GAMMA RAY COUNTER

(71) Applicant: Precision Drilling Corporation, Calgary (CA)

(72) Inventor: Carlos Contreras, Katy, TX (US)

(73) Assignee: Precision Drilling Corporation, Calgary (CA)

( * ) Notice: Subject to any disclaimer, the term of this patent is extended or adjusted under 35 U.S.C. 154(b) by 0 days.

(21) Appl. No.: 16/398,338

(22) Filed: Apr. 30, 2019

(65) Prior Publication Data

US 2019/0331827 A1 Oct. 31, 2019

Related U.S. Application Data

(60) Provisional application No. 62/664,270, filed on Apr. 30, 2018.

(51) Int. Cl.
*G01V 5/10* (2006.01)
*G01V 5/06* (2006.01)
*G01T 1/40* (2006.01)

(52) U.S. Cl.
CPC .............. *G01V 5/101* (2013.01); *G01T 1/40* (2013.01); *G01V 5/06* (2013.01)

(58) Field of Classification Search
CPC ............ G01V 5/101; G01V 5/06; G01T 1/40
See application file for complete search history.

(56) References Cited

U.S. PATENT DOCUMENTS

| | | | |
|---|---|---|---|
| 2009/0030616 A1* | 1/2009 | Sugiura | G01V 11/00 702/9 |
| 2011/0161009 A1* | 6/2011 | Wang | G01V 1/48 702/9 |

* cited by examiner

*Primary Examiner* — Edwin C Gunberg
(74) *Attorney, Agent, or Firm* — The Kubiak Law Firm PLLC

(57) ABSTRACT

The current invention utilizes a downhole gamma ray counter having a processor and database to radially allocate gamma ray counts into buckets. Once a circumferential count is completed the buckets are utilized to form a pattern. The created pattern is then compared to various patterns within the database. Once a corresponding pattern is found within the database a value that is assigned to that pattern is transmitted to the surface. On the surface a surface processor compares the value to the values within the surface database finding the pattern assigned to that value. The surface processor and estimates the time of creation of the pattern downhole and uses the estimated time of creation and the pattern from the surface database to create an image of a portion of a wellbore.

5 Claims, 2 Drawing Sheets

| Total GR | Bucket1 | Bucket2 | Bucket3 | Bucket4 | Bucket5 | Bucket6 | Bucket7 | Bucket8 |
|---|---|---|---|---|---|---|---|---|
| 70.13 | 1.04 | 0.92 | 1.04 | 1.19 | 1.01 | 0.97 | 0.96 | 0.92 |

GAMMA RAY COUNTER

CROSS-REFERENCE TO RELATED APPLICATIONS

This application claims priority to U.S. Provisional Patent Application No. 62/664,270 that was filed on Apr. 30, 2018.

BACKGROUND

Contrary to other measurements acquired using logging devices in the oil and gas drilling industry, natural gamma ray does not provide significant petrophysical information.

The initial use of natural gamma ray for measuring was for wireline tools. Wireline tools primarily utilized natural gamma rays as a way to better understand depth in mostly vertical or deviated wellbores, usually as a correlation to several wells in a given field.

With the advent of unconventional field developments, focus in cost control lead to the misuse of natural gamma ray measurements for geo-steering which demonstrably yielded poor well performance in many scenarios. This conclusion was derived given the propensity by users to ignore both geological lateral heterogeneities and wellbore location uncertainty, as well as the incorrect interpretation of omni-directional natural gamma-ray data.

SUMMARY

The use of gamma ray images helps to mitigate the aforementioned issues, by utilizing a numeric value based upon the gamma ray count to assign a color to a discriminate portion of the circumference of the tool, in addition to depth information, a 3-dimensional rendering of the data acquired during drilling operations is provided. Thereby providing a method to encode average gamma ray values with a pattern describing the contribution from around the borehole as the tool rotates. The tool incorporates a sensor with an oriented or focused preferential window for gathering gamma ray counts.

More specifically, the envisioned gamma ray tool allows three dimensional images to be created based upon the pattern recognition of gamma rays. The gamma ray counts are placed in the proper bucket, where the bucket is associated with a particular radial orientation. There are at least two buckets but any number of buckets may be used as long as each bucket coincides with particular radial orientation. Preferably there are two, four, or eight buckets. Once the gamma ray counter has made a complete rotation and the gamma ray counts are placed in the proper buckets the data is processed downhole based upon gamma ray count, dwell time of the gamma ray counter for any particular bucket, rate of penetration and other data in order to build a pattern. The downhole processor then chooses the most closely related pattern in the downhole tool's database. The pattern in the downhole tools database has been previously assigned a value. The value is then transmitted to the surface. On the surface the surface processor takes the transmitted value and chooses the pattern in the surface processor's database that corresponds to the value. Each value should correspond to the same or similar pattern in both the surface processor's database and the downhole processor's database. The surface processor estimates a time that the gamma ray counts were taken to determine tool orientation and depth and then uses the pattern that corresponds to the transmitted value to construct an image of the wellbore based upon the pattern transmitted to the surface. Generally, the data is transmitted from the downhole processor to the surface processor acoustically however any data transmission means may be utilized.

FIGURES

FIG. 1 depicts a tool having two buckets where one bucket is oriented from 270 to 90 degrees and a second bucket is oriented from 90 to 270 degrees.

FIG. 2 depicts a tool having four buckets where the first bucket is oriented from 315 to 45 degrees, the second bucket is oriented from 45 to 135 degrees, the third bucket is oriented from 135 to 225 degrees, and the fourth bucket is oriented from 225 to 315 degrees.

DETAILED DESCRIPTION

High-Side is the upside of the borehole.

RPM is Revolutions per Minute

RPM-Threshold is the selected RPM to begin the Bucketing process

Inclination-Threshold is the approximate value at which the pattern recognition algorithm is triggered. This threshold allows for image creation using fewer patterns.

Gamma Ray Counts are generated by the gamma detector as natural gamma rays are recorded by the scintillation crystal.

Time Window is the duration for Bucketing. This is user selectable, and it is a factor of ROP and RPM ROP is rate of penetration Data is a Gamma Ray Count Data Density is the number of data points per unit of measure, typically feet or meters Data Statistics is the variability of acquired values, given the nuclear decay nature of the measurement.

Image is the presentation of data relative to borehole orientation, high side in this case.

Logging Sequence is the combination of data, configured into the MWD tool for real-time transmission Generally, a Bucket is considered to be a radial span whereby all Gamma Ray Counts are grouped into a Bucket, as their tool window orientation falls within the bucket limits. The process of adding Gamma Ray counts to each bucket is referred to as Bucketing.

Figure 1:
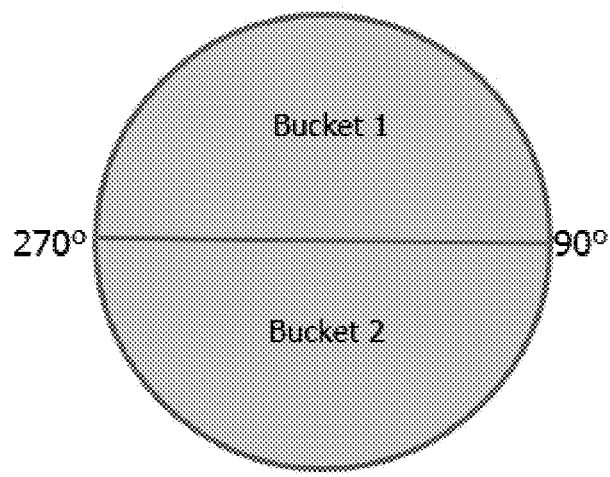
Figure 2:
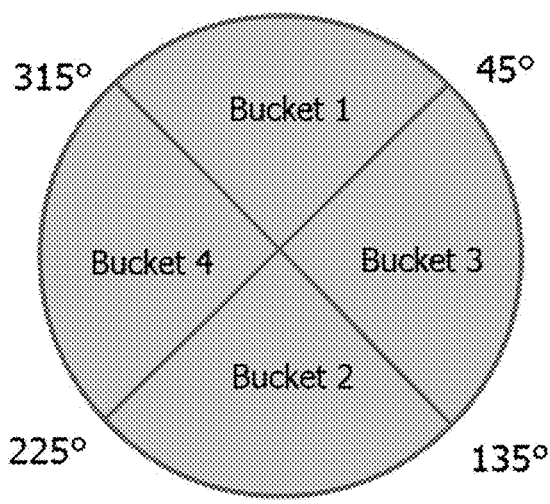
Figures 3, 4:
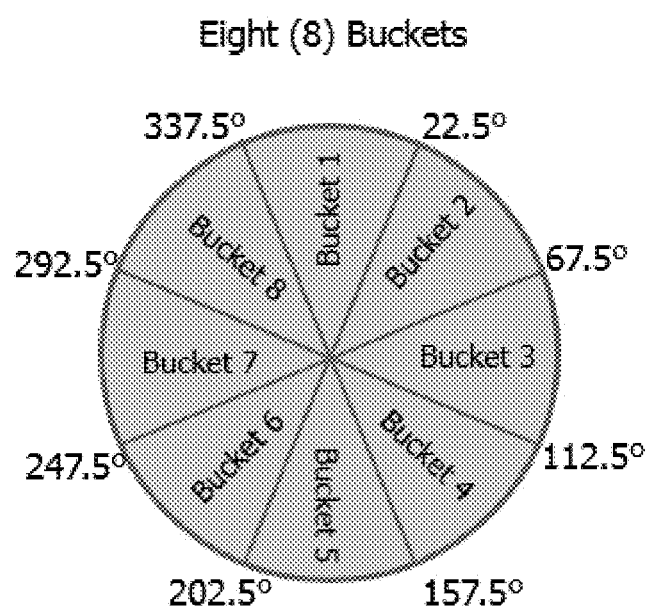
FIG. 3 depicts a tool having eight buckets where the first bucket is oriented from 337.5 to 22.5 degrees.
FIG. 4 is an example of a data array.

FIG. 1 depicts a tool having two buckets where one bucket is oriented from 270 to 90 degrees and a second bucket is oriented from 90 to 270 degrees. FIG. 2 depicts a tool having four buckets where the first bucket is oriented from 315 to 45 degrees, the second bucket is oriented from 45 to 135 degrees, the third bucket is oriented from 135 to 225 degrees, and the fourth bucket is oriented from 225 to 315 degrees. FIG. 3 depicts a tool having eight buckets where the first bucket is oriented from 337.5 to 22.5 degrees, the second bucket is oriented from 22.5 to 67.5 degrees, the third bucket is oriented from 67.5 to 112.5 degrees, the fourth bucket is oriented from 112.5 to 157.5 degrees, the fifth bucket is oriented from 157.5 to 202.5 degrees, the sixth bucket is oriented from 202.5 to 247.5 degrees, the seventh bucket is oriented from 247.5 to 292.5 degrees, and the eighth bucket is oriented from 292.5 to 337.5 degrees. The number of buckets and orientation of each bucket is merely meant to exemplify bucket configuration.

While the tool is rotating at a higher RPM than the RPM-Threshold, Data is acquired in a bucket, see FIGS. 1-3.

Inclination Threshold can be adjusted typically from about 30 to about 70 degrees. Preferably there are three options for buckets: Two (2), Four (4) or Eight (8) as depicted in FIGS. 1-3.

Gamma Ray Counts are added to each Bucket through a user selectable Time Window. Different Time Windows are user defined as a function of ROP, desired Data Density, and desired Data Statistics. A Total Gamma Ray Counts value is calculated as the arithmetic average of all Buckets, divided by Time Window. A Pattern is selected by approximation from library and stored with a time stamp in memory. The pattern is defined as the proportional contribution from each bucket towards the Total Gamma ray value. A Total Gamma ray value is stored with each Pattern.

FIG. 4 is an example of a data array. The data array in FIG. 4 includes a total Gamma Ray count and the Gamma Ray count in each bucket.

In real-time data is sent as function of the Logging Sequence. The number of possible Patterns is a function of $2^n$, where n is the number of bits stored in memory. For example, by using an integer of 16 bits in memory, 65,536 patterns can be defined.

Advantages:
Smaller memory use
Intrinsic high data compression
Easy signal reconstruction using total average value
Patterns can be used "as is" to enhance 3 dimensional features with minimal or no additional processing.

Time window is the estimated time when the gamma ray count was taken, usually based upon the time for acoustic transmission of the data to the surface.

Axial penetration is based upon rate of penetration vs time.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method of counting gamma rays comprising:
   rotating a gamma ray counter within a well,
   assigning a gamma ray count to at least two buckets,
   creating a total gamma ray count,
   creating a first pattern based upon the gamma ray count,
   selecting a second pattern in a downhole database that most closely corresponds to the first pattern,
      wherein the second pattern has a value that corresponds to the second pattern,
   transmitting the value to a surface processor,
   selecting a third pattern in a surface database that corresponds to the value,
      wherein the first pattern and the third pattern are equivalent.

2. The method of counting gamma rays of claim 1 wherein, the number of possible patterns is a function of $2^n$ where n is the number of bits stored in memory.

3. The method of counting gamma rays of claim 1 wherein, a surface processor estimates a time of creation of the first pattern and applies the time of creation to the third pattern.

4. The method of counting gamma rays of claim 3 wherein, the surface processor creates an image of a wellbore location utilizing the third pattern and the time of creation.

5. The method of counting gamma rays of claim 1 wherein, a downhole processor saves the first pattern and an actual time of creation in a downhole database.

* * * * *